Patented Apr. 22, 1952

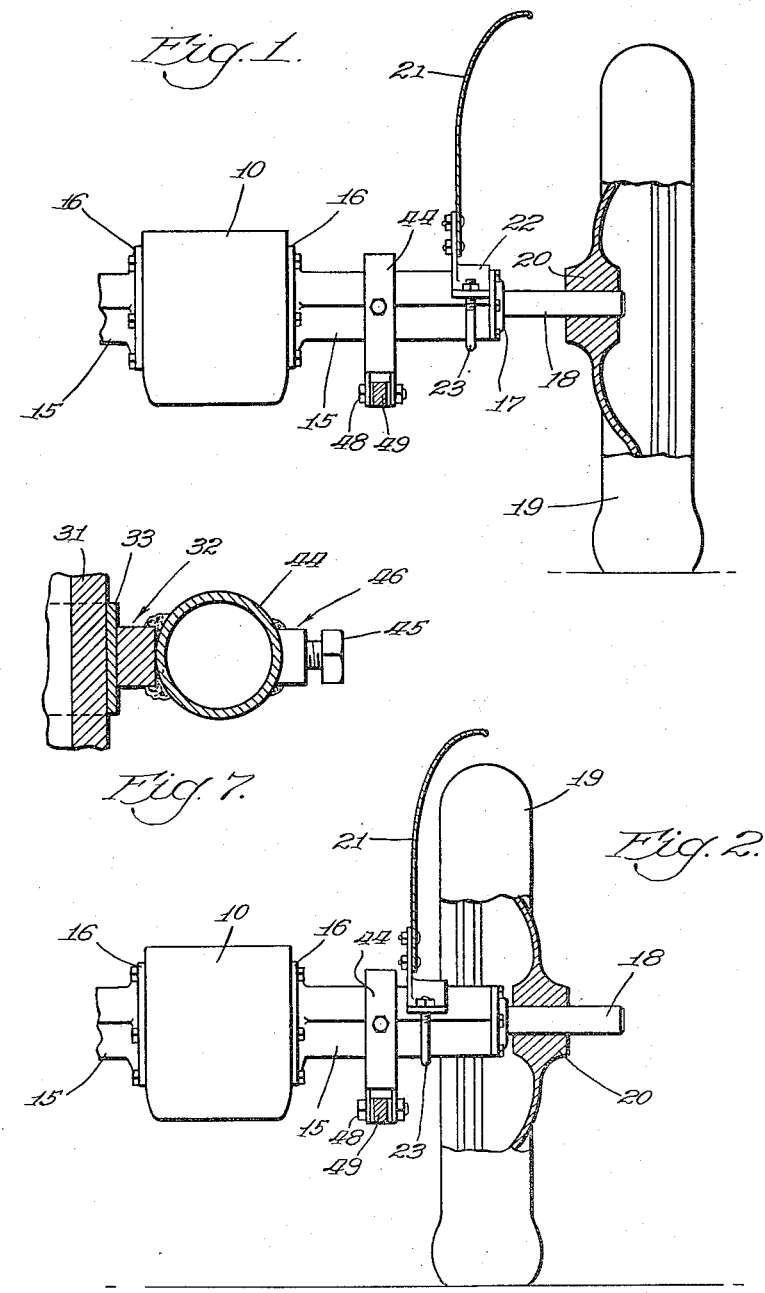

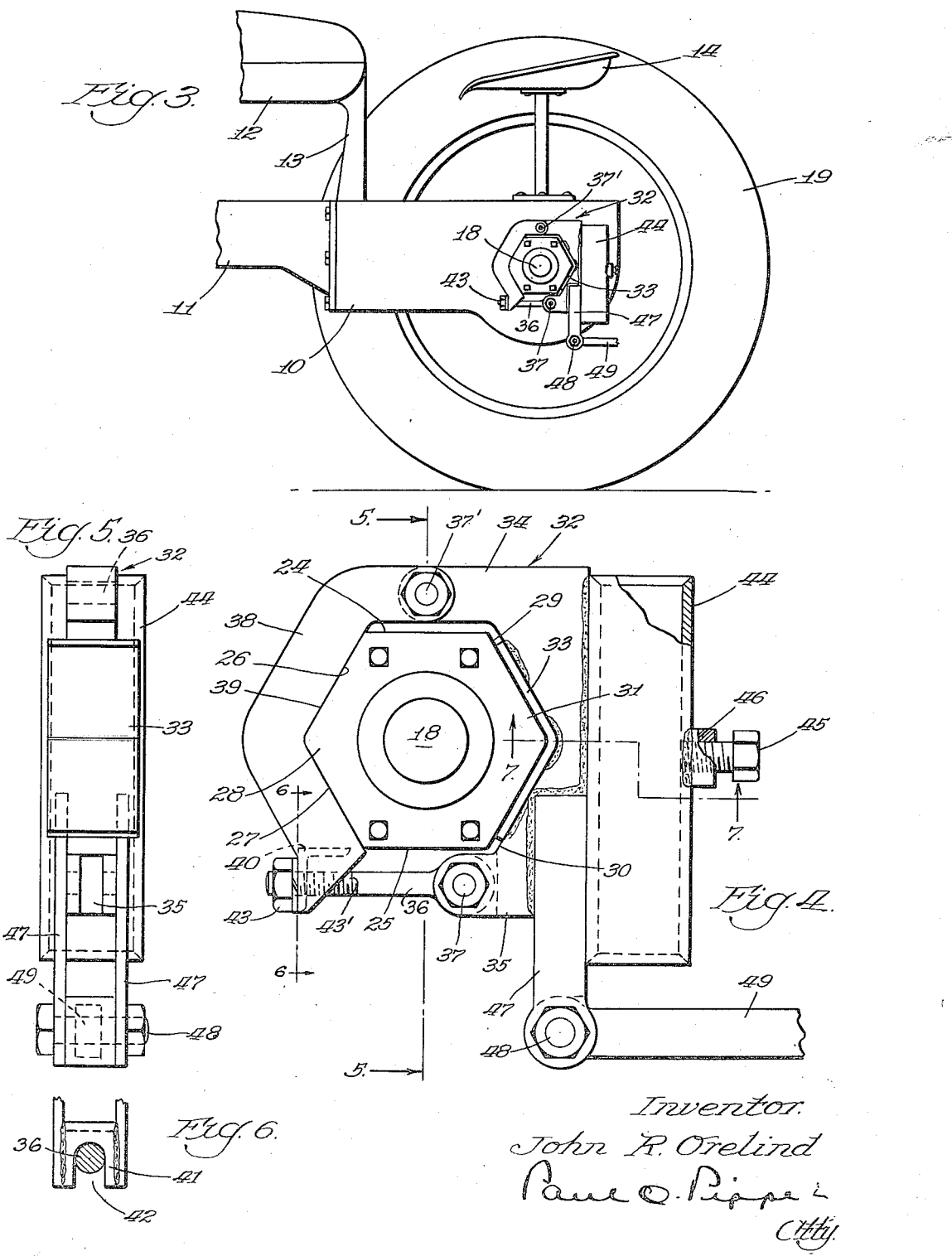

2,593,692

UNITED STATES PATENT OFFICE 2,593,692

IMPLEMENT ATTACHING STRUCTURE FOR TRACTORS

John R. Orelind, Wilmette, Ill., assignor to International Harvester Company, a corporation of New Jersey Application December 9, 1947, Serial No. 790,661

2 Claims. (Cl. 280—33.44)

This invention relates to agricultural tractors and more particularly to features of a rear axle housing for facilitating the connection and disconnection of attaching brackets for implements or other structure being supported by or attached to the tractor.

The principal object of the invention is to provide a tractor axle housing structure uniform in cross-section and symmetrical circumferentially for the attachment of implement securing means in a location lengthwise of the axle housing and at various locations around the axle housing.

A more specific object is to provide a polygonal axle structure having symmetrical angular faces for cooperation with attaching brackets.

Another object is to provide a securing bracket which can be readily clamped to the housing structure of the invention and at a plurality of locations on said housing.

Another important object is to provide an axle housing structure uniform in cross-section from the body of a tractor to the outer end thereof for the provision of fender mounting means whereby fenders may be moved laterally to accommodate different wheel spacings.

The above objects and others which will appear in the detailed description to follow are accomplished by a construction such as illustrated in the drawings in which:

Figure 1 is a rear view of a portion of a tractor showing axle housings extending therefrom and a traction wheel with a fender at one side thereof;

Figure 2 shows the same structure as Figure 1 with the traction wheel moved into a narrow trend position;

Figure 3 is a side elevation of the tractor structure shown in Figure 1 with one traction wheel removed to better see the housing and bracket structure of the invention;

Figure 4 is an enlarged view of the axle housing and the bracket structure shown in Figure 3;

Figure 5 is a view taken substantially on the line 5—5 of Figure 4 with the axle housing removed;

Figure 6 is a fragmentary view taken on the line 6—6 of Figure 4; and

Figure 7 is a view taken substantially on the line 7—7 of Figure 4.

In the construction illustrated the tractor shown is of the conventional farm type having a generally oblong shaped narrow transmission housing structure 10 which also includes a differential. A portion of a frame structure 11 is illustrated extending forwardly from the housing structure 10. A rear portion of the fuel tank 12 is illustrated with the supporting bracket 13 extending upwardly from the housing structure 10. An operator's station 13 is shown at the rear of the tractor. It will be understood that only such parts of the tractor are shown as are necessary to provide an environment for the structure which involves the invention.

At each side of the housing structure 11 an axle housing 15 extends laterally, said housing being secured to the housing structure 10 by flanges 16 and suitable securing wheels. The housing structures 15 are identical and only one will be described.

The axle housing 15 is uniform in cross-section from adjacent flange 16 to the outside end of the housing. A cover plate 17 is illustrated secured to the end of the housing 15, said cover plate being of substantially the same shape and dimension as the housing 15. A drive axle 18 extending from the axle housing 15 through the cover plate 17 carries a traction wheel 19. It will be noted that the drive axle 18 extends a substantial distance from the end of the housing 15 to provide means for adjusting the position of the traction wheel 19 and thereby altering the tread of the tractor. It will be noted also that a hub 20 of the traction wheel 19 is offset with respect to the centerline of the wheel, whereby reversing of the wheel provides for a much greater adjustment in tread than is provided by the extending end of the drive axle 18. With the wheel in the adjusted position shown in Figure 2, the end of axle housing 15 is overlapped a substantial amount by the overhanging portion of the wheel.

A fender 21 is shown as being secured by a bracket 22 and a clamping U-bolt 23 to the axle housing 15. In Figure 1 said fender is positioned as far out on the axle housing as possible. In Figure 2 the fender is moved inwardly on the axle housing to provide for the narrow tread position of the wheel. The axle housing which is uniform in cross-section as previously described provides for this adjustment as well as for other adjustments of attaching brackets to be hereinafter described.

As best shown in Figure 4, the axle housing is hexagonal in cross-section with an upper face 24 and a parallel lower face 25 lying horizontally parallel to the ground. Said upper face forms an effective and safe flat step for the operator of the tractor. Two adjacent faces 26 and 27 are joined with the faces 24 and 25 respectively forming a forwardly extending rib-like portion 28. Angularly related adjacent faces 29 and 30 form a rearwardly projecting rib-like portion 31. The faces 29 and 30 join respectively with faces 24 and 25. It will also be noted that any two adjacent faces form rib-like portions which provide attaching means extending lengthwise of the axle housing and provide for attaching brackets at 60° locations at any point around the axle housing.

The attaching bracket structure illustrated includes a bracket 32 to which a V-shaped plate 33 is attached by welding, as illustrated, said plate having a 120° divergence angle between the two portions so as to fit one of the rib-like portions on the axle housings such as the portion 31. The bracket 32 has an extension 34 at its upper end spaced somewhat above the upper face 24 to provide for variation in size due to manufacturing tolerances. The bracket 32 also includes an extension 35 at the bottom spaced somewhat above the face 25. Said extension 35 is slotted to receive the head portion of an eyebolt 36 which is pivotally secured to the extension by a bolt 37 extending through the slotted portion of the extension 35.

The upper extension 34 is provided with an opening 36' through which a bolt 37' extends to pivotally secure a pair of clamping elements 38 to the extension 32. Said elements have V-shaped edge portions 39 having a divergence angle of 120° in order to fit a rib-like portion of the axle housing such as the portion 28. The lower ends of the elements 38 are secured to a spacer 40 which has a vertical portion 41 provided with a slot 42 for receiving the bolt 36. It will be understood that the bracket structure may be attached to the axle housing but abutting the V-shaped plate 33 against the rib-like portion 31 and swinging the securing element 38 into the position illustrated after which the bolt 36 is swung into position in the slot 42. A nut 43 on the threaded portion 43' of the bolt is then tightened for securing the bracket structure rigidly on the axle housing in a position laterally thereof. It is also to be understood that the bracket structure may be secured on the opposite side of the axle housing with the plate 33 abutting the rib-like portion 28 or at any position circumferentially around the housing structure at 60° intervals.

The bracket 32 may be secured to any suitable means for securing implements or other structure to the tractor. As illustrated, a sleeve 44 is secured as by welding to the vertical edge portion of the bracket 32. A capscrew 45 is illustrated extending through a threaded boss 46 to be used for clamping attaching shafts in the sleeve 44. A pair of attaching members 47 are secured to opposite faces of the bracket 32 adjacent the sleeve 44 extending downwardly therefrom. Alined openings in said attaching members provide for the insertion of a bolt 48 which, as illustrated, pivotally secures an attaching element 49 to the bracket structure.

It is to be understood that various types of attaching brackets may be constructed utilizing the essential elements of the structure illustrated in the preferred form of the invention. Applicant claims as his invention all modifications falling within the scope of the appended claims.

What is claimed is:

1. In combination, a tractor having an axle, a housing hexagonal in section surrounding said axle, implement attaching means adapted to be secured to said housing and held against relative angular movement including an implement support angularly shaped to conform to the angle made by adjacent faces of said hexagonal housing, clamping elements shaped to conform to the angles made by the other faces of said housing and being pivotally connected to said support, and means for releasably securing said implement attaching means to said housing against angular movement with respect thereto.

2. In combination, a tractor having an axle, a housing hexagonal in section surrounding said axle, implement attaching means adapted to be secured to said housing and held against relative angular movement including an implement support angularly shaped to conform to the angle made by adjacent faces of said hexagonal housing, clamping elements shaped to conform to the angles made by the other faces of said housing, said clamping elements partly surrounding said housing and being pivotally connected to said support, and adjustable means connecting the free ends of said elements for tightening and securing said implement attaching means upon said housing.

JOHN R. ORELIND.

REFERENCES CITED

The following references are of record in the file of this patent:

UNITED STATES PATENTS

| Number | Name | Date |
| --- | --- | --- |
| 2,099,194 | Brown | Nov. 16, 1937 |
| 2,117,562 | Marsch | May 17, 1938 |
| 2,143,726 | Acton | Jan. 10, 1939 |
| 2,176,326 | Brown et al. | Oct. 17, 1939 |
| 2,187,411 | Bechman | Jan. 16, 1940 |
| 2,302,570 | Peterson | Nov. 17, 1942 |
| 2,452,829 | Blaydes | Nov. 2, 1948 |